US012555113B2

(12) United States Patent
Krishnamoorthy et al.

(10) Patent No.: US 12,555,113 B2
(45) Date of Patent: Feb. 17, 2026

(54) SYSTEM AND METHOD FOR AUTHENTICATING IDENTITY USING DYNAMIC BIOMETRIC FACTORS

(71) Applicant: Mastercard International Incorporated, Purchase, NY (US)

(72) Inventors: Parthasarathy Munuswamy Krishnamoorthy, Lake Saint Louis, MO (US); Dan P. Scucchi, St. Charles, MO (US); Richard G. Davis, Lake Saint Louis, MO (US); Trevor Scott Owen, Saint Peters, MO (US); Jennifer Hausman-Wilcox, Dardeen Prairie, MO (US); Chris Mavromatis, Crestwood, MO (US); Jason Wake, Lake Saint Louis, MO (US)

(73) Assignee: Mastercard International Incorporated, Purchase, NY (US)

( * ) Notice: Subject to any disclaimer, the term of this patent is extended or adjusted under 35 U.S.C. 154(b) by 111 days.

(21) Appl. No.: 18/488,108

(22) Filed: Oct. 17, 2023

(65) Prior Publication Data

US 2025/0124440 A1 Apr. 17, 2025

(51) Int. Cl.
*G06F 21/32* (2013.01)
*G06Q 20/40* (2012.01)

(52) U.S. Cl.
CPC ... *G06Q 20/40145* (2013.01); *G06Q 20/4015* (2020.05)

(58) Field of Classification Search
CPC ............ G06Q 20/40145; G06Q 20/4015
See application file for complete search history.

(56) References Cited

U.S. PATENT DOCUMENTS 7,133,792 B2 11/2006 Murakami et al.
10,334,346 B2 * 6/2019 Boesen ............... H04R 1/1016
(Continued)

FOREIGN PATENT DOCUMENTS

CN 107609365 A * 1/2018 ............. G06F 21/32

OTHER PUBLICATIONS

"Towards an intelligent adaptive security framework for preventing and detecting credit card fraud", Asma Cherif, Dec. 2022 (Year: 2022).*

Primary Examiner — Duan Zhang
(74) Attorney, Agent, or Firm — Hovey Williams LLP

(57) ABSTRACT

A system and method for authenticating identity during a financial transaction based, in part, on dynamic biometric factors such as body temperature, heart rhythm, blood pressure, blood sugar, vein pattern, skin pore pattern, and voice recognition. The biometric values are captured, aggregated, and patterned over time to create a unique biometric profile. When a transaction is initiated, current biometric values are captured and compared to the biometric patterns, and a biometric authentication determination is made based on the results. An overall identity authentication score is generated based on a combination of the biometric authentication determination and other identity authentication determinations such as a purchase pattern authentication determination or a location authentication determination. An identity authentication determination is made based on the overall identity authentication score and communicated to the merchant. Further, the transaction may be rejected when the overall identity authentication score violates a pre-established fraud threshold value.

20 Claims, 3 Drawing Sheets

(56) References Cited

U.S. PATENT DOCUMENTS

| | | |
|---|---|---|
| 11,368,849 B1 * | 6/2022 | Reeves ................ H04W 12/67 |
| 2007/0062816 A1 | 3/2007 | Chung et al. |
| 2013/0259330 A1 * | 10/2013 | Russo ................ G06V 40/1365 |
| | | 382/115 |
| 2016/0253651 A1 * | 9/2016 | Park ....................... G06Q 20/34 |
| | | 705/39 |
| 2017/0140367 A1 | 5/2017 | Zhou et al. |
| 2017/0215778 A1 * | 8/2017 | Koide ..................... A61B 5/681 |
| 2020/0236545 A1 | 7/2020 | Xu et al. |
| 2020/0285873 A1 | 9/2020 | Condon |

* cited by examiner

| | Pattern Match | Pattern DOES NOT Match | Can be Overridden Y/N? |
|---|---|---|---|
| Body Temperature | ✓ | | Y |
| Heart Rhythm | ✓ | X | Y |
| Blood Pressure | ✓ | | Y |
| Blood Sugar | ✓ | | Y |
| Vein Pattern | ✓ | | N |
| Skin Perspiration | ✓ | | N |
| Voice Recognition | ✓ | | N |
| Identify Confirmed>>> | | | |

FIG. 2

SYSTEM AND METHOD FOR AUTHENTICATING IDENTITY USING DYNAMIC BIOMETRIC FACTORS

FIELD

The present invention relates to systems and methods for authenticating identities in financial transactions, and more particularly, embodiments provide a system and method for authenticating a user's identity during a financial transaction with a merchant by comparing current biometric values for dynamic biometric factors to biometric patterns developed over time to produce a biometric authentication determination which is combined with one or more other identity authentication determinations to produce an overall identity authentication score.

BACKGROUND

It is sometimes desirable to authenticate a person's identity using a biometric factor. Systems and methods are known, for example, that check for a simple match of a single, static biometric factor, such as a fingerprint. However, static biometric factors can be relatively easy to forge because they do not change over time.

This background discussion is intended to provide information related to the present invention which is not necessarily prior art.

SUMMARY

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

Embodiments address the above-identified limitations and problems in the prior art by providing a system and method for authenticating a user's identity during a financial transaction by comparing current biometric values for dynamic biometric factors to biometric patterns developed over time to produce a biometric authentication determination which is combined with one or more other identity authentication determinations to produce an overall identity authentication score.

In a first embodiment, a system is provided for authenticating a user's identity during a financial transaction with a merchant. The system may include a biometric capture module, a biometric authentication module, and an authentication decision module. The biometric capture module, which may be provided in a smart watch or other device worn by or otherwise associated with the user, may be configured to capture a plurality of biometric values of the user, including a plurality of first biometric values for a first dynamic biometric factor and a plurality of second biometric values for a second dynamic biometric factor. The biometric authentication module, which may be provided in the smart watch or in a smart phone of the user, may be configured to receive and aggregate the plurality of biometric values over a period of time of at least thirty days, or at least sixty days, to create a unique biometric profile of the user, including receiving and aggregating the plurality of first biometric values into a first biometric factor pattern and receiving and aggregating the plurality of second biometric values into a second biometric factor pattern. The biometric authentication module may include a biometric authentication determination module and a reporting module. The biometric authentication determination module may be configured to receive a notification of a current financial transaction, receive a plurality of current biometric values, including current first and second biometric values, compare the current biometric values to their respective biometric factor patterns in the unique biometric profile and generate a plurality of comparison results, including comparing the current first and second biometric values to the respective first and second biometric factor patterns and generating respective first and second comparison results, and make a biometric authentication determination based on the comparison results. The reporting module may be configured to communicate the biometric authentication determination via a communication network to the authentication decision module. The authentication decision module may be configured to generate an overall identity authentication score based on a combination of the biometric authentication determination, a purchase pattern authentication determination based on a pattern of past purchases by the user, and a location authentication determination based on a recent geographic location of the user prior to the current financial transaction, make an identity authentication determination based on the overall identity authentication score, and communicate the identity authentication determination for the user to the merchant for the current financial transaction.

In a second embodiment, a method is provided for authenticating a user's identity during a financial transaction with a merchant. The method may include the following steps. A plurality of biometric values of the user may be captured, by, e.g., a smart watch or other device worn by or otherwise associated with the user, including a plurality of first biometric values for a first dynamic biometric factor and a plurality of second biometric values of a second dynamic biometric factor. The plurality of biometric values may be received and aggregated, by, e.g., the smart watch or a smart phone of the user, over a period of time of at least thirty days, or at least sixty days, to create a unique biometric profile of the user, including receiving and aggregating the plurality of first biometric values into a first biometric factor pattern and receiving and aggregating the plurality of second biometric values into a second biometric factor pattern. A notification of a current financial transaction may be received. A plurality of current biometric values may be received, including current first and second biometric values. The current biometric values may be compared to their respective biometric factor patterns in the unique biometric profile and a plurality of comparison results may be generated, including comparing the current first biometric value to the first biometric factor pattern and generating a first comparison result, and comparing the current second biometric value to the second biometric factor pattern and generating a second comparison result. A biometric authentication determination may be made based on the comparison results. The biometric authentication determination may be communicated via a communication network to an authentication service that may generate an overall identity authentication score based on a combination of the biometric authentication determination, a purchase pattern authentication determination based on a pattern of past purchases by the user, and a location authentication determination based on a recent geographic location of the user prior to the current financial transaction, make an identity authentication determination based on the overall identity authentication score, and communicate the identity authentication determination for the user to the merchant for the current financial transaction.

Various implementations of the above-described first and second embodiments may include any one or more of the following features. The plurality of dynamic biometric factors may include a body temperature of the user, wherein a plurality of body temperature biometric values are aggregated over the period of time into a body temperature biometric factor pattern in the unique biometric profile of the user. The plurality of dynamic biometric factors may include a heart rhythm of the user, wherein a plurality of heart rhythm biometric values are aggregated over the period of time into a heart rhythm biometric factor pattern in the unique biometric profile of the user. The plurality of dynamic biometric factors may include a blood pressure of the user, wherein a plurality of blood pressure biometric values are aggregated over the period of time into a blood pressure biometric factor pattern in the unique biometric profile of the user. The plurality of dynamic biometric factors may include a blood sugar of the user, wherein a plurality of blood sugar biometric values are aggregated over the period of time into a blood sugar biometric factor pattern in the unique biometric profile of the user. The plurality of dynamic biometric factors may include a vein pattern of the user, wherein a plurality of vein pattern biometric values are aggregated over the period of time into a vein pattern biometric factor pattern in the unique biometric profile of the user. The plurality of dynamic biometric factors may include a skin pore pattern of the user, wherein a plurality of skin pore pattern biometric values are aggregated over the period of time into a skin pore pattern biometric factor pattern in the unique biometric profile of the user. The plurality of dynamic biometric factors may include a voice recognition pattern of the user, wherein a plurality of voice recognition biometric values are aggregated over the period of time into a voice recognition biometric factor pattern in the unique biometric profile of the user. The authentication decision module may reject the financial transaction when the overall identity authentication score violates a pre-established fraud threshold value.

This summary is not intended to identify essential features of the present invention, and is not intended to be used to limit the scope of the claims. These and other aspects of the present invention are described below in greater detail.

DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 2 is a table depicting the results of comparing current biometric values to biometric factor patterns at the time of the financial transaction.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly, embodiments provide a system and method for authenticating a user identity during a financial transaction with a merchant by comparing current biometric values for dynamic biometric factors to biometric patterns developed over time to produce a biometric authentication determination which is combined with one or more other identity authentication determinations to produce an overall identity authentication score. The dynamic biometric factors may include any two or more of body temperature, heart rhythm, blood pressure, blood sugar, vein pattern, skin pore pattern, and/or voice recognition. The biometric data may be captured by substantially any suitable technology, such as a smart watch or other sensing device worn by or otherwise associated with the user. Thus, embodiments advantageously increase transaction security by adding biometric profiling based on dynamic biometric factors to other identity authentication determining technologies.

Figure 1:
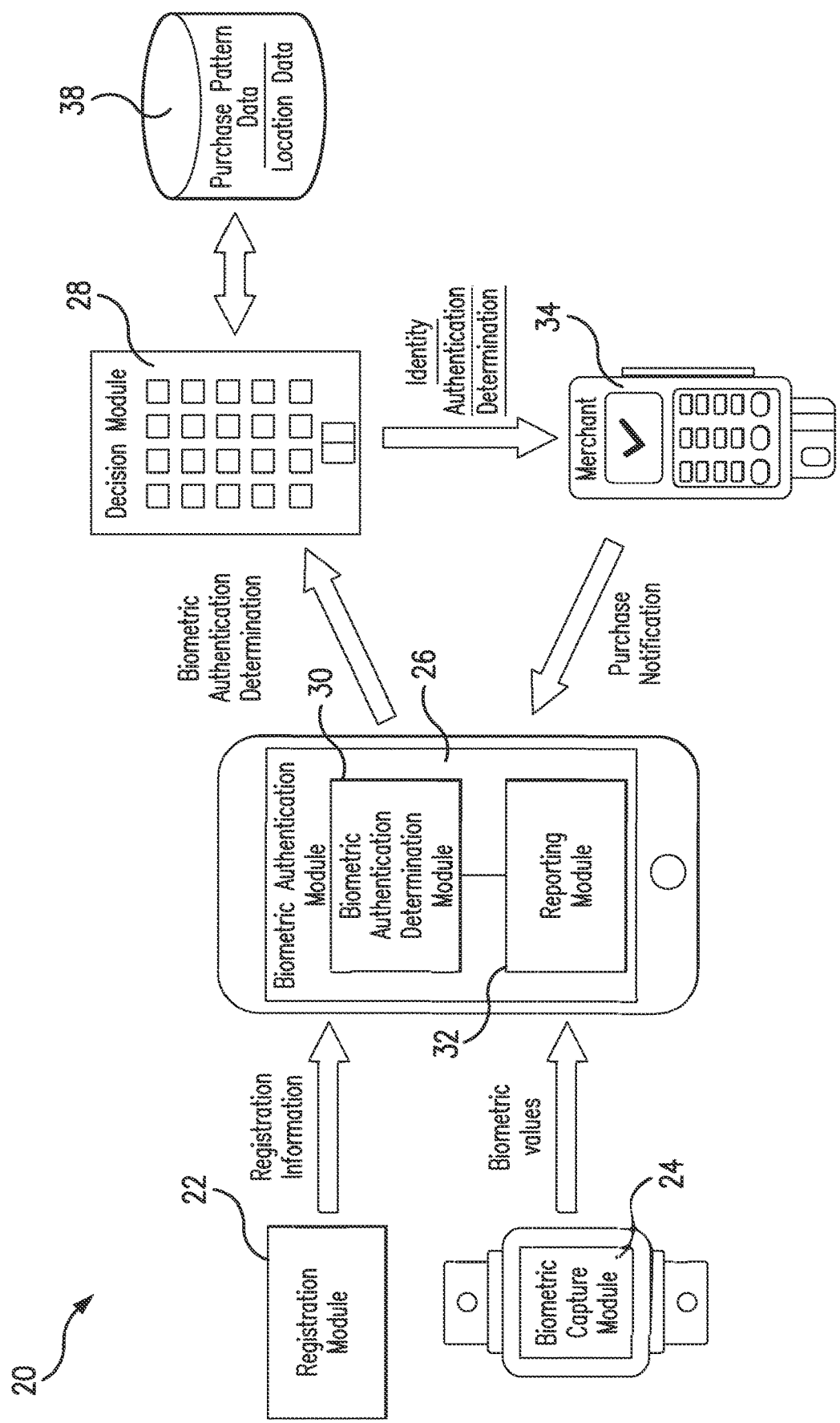
FIG. 1 is a block diagram of an embodiment of a system for authenticating a user's identity during a financial transaction.

Referring to FIGS. 1 and 2, an embodiment of a system 20 for authenticating a user's identity during a financial transaction is shown. The system 20 increases transaction security by adding biometric profiling based on dynamic biometric factors. The system 20 may broadly include a registration module 22, a biometric capture module 24, a biometric authentication module 26, and an authentication decision module 28. The biometric authentication module 26 may further include a biometric authentication determination module 30 and a reporting module 32. In one implementation, the function of the system 20 may be reflected in the steps of the method 120 described below and may include any additional features described in association with the method 120.

The registration module 22 may be configured to facilitate initial registration by the user, including receiving and storing profile information of a user and activating the identity authentication functionality provided by the system 20. The biometric capture module 24 may be configured to measure, characterize, or otherwise capture the plurality of biometric values of the user, including a plurality of first biometric values for a first dynamic biometric factor and a plurality of second biometric values of a second dynamic biometric factor. The captured biometric factors may be any two or more of body temperature, heart rhythm, blood pressure, blood sugar, vein pattern, skin pore pattern, and/or voice recognition. In one implementation, the biometric capture module 24 may be characterized as being "local" (i.e., to the user and/or the transaction) in that it may be provided in a smart watch or other device worn by or otherwise associated with the user.

For example, one dynamic biometric factor may be body temperature. Body temperature will generally be approximately between ninety-seven degrees (97°) Fahrenheit (F) and ninety-nine degrees (99°) F. Body temperature data may be aggregated over a period of time (e.g., at least thirty (30) days, or at least sixty (60) days, and, thereafter, old data may be progressively overwritten with new data) to establish a body temperature pattern that may be part of the user's unique biometric profile. An acceptable range on which to base identity may be a body temperature at or above ninety-seven degrees (97°) F. A hyperthermia, or fever, alert may be generated if the body temperature is at or above one hundred-point-four degrees (100.4°) F., and a hypothermia alert may be generated if the body temperature is at or below ninety-seven degrees (97°) F.

Another dynamic biometric factor may be heart rhythm. Heart rhythm will generally be regular except when exercising. Heart rhythm data may be similarly aggregated over the period of time to establish a heart rhythm pattern that may be part of the user's unique biometric profile. An acceptable range on which to base identity may be a heartbeat of approximately between sixty (60) and one hundred (100) beats per minute, a PR interval of approximately between twelve-hundredths (0.12) and twenty-hundredths (0.20) of a second, and a QRS interval of less than twelve-hundredths (0.12) of a second. A health alert may be generated if the user's heartbeat is greater than one hundred (100) beats per minute, a PR interval of greater than twenty-hundredths (0.20) of a second, and a QRS interval of greater than twelve-hundredths (0.12) of a second.

Another dynamic biometric factor may be blood pressure. Blood pressure generally rises in the morning, peaks at midday, and drops in the late afternoon and evening. Blood pressure data may be aggregated over the period of time to establish a blood pressure pattern that may be part of the user's unique biometric profile. An acceptable range on which to base identity may be a blood pressure of approximately equal to or greater than one hundred twenty (120) millimeters of mercury (mm Hg) systolic and eighty (80) mm Hg diastolic. An elevated blood pressure alert may be generated if the user's blood pressure is greater than one hundred thirty (130) mm Hg systolic and eighty (80) mm Hg diastolic, and a hypertension alert may be generated if the user's blood pressure is greater than one hundred forty (140) mm Hg systolic and eighty (80) mm Hg diastolic.

Another dynamic biometric factor may be blood sugar. Blood sugar generally rises in the morning, peaks at midday, and drops in the late afternoon and evening. Blood sugar data may be aggregated over the period of time to establish a blood sugar pattern that may be part of the user's unique biometric profile. An acceptable range on which to base identity may be a blood sugar of approximately between eighty-two (82) milligrams per deciliter (mg/dl) to one hundred ten (110) mg/dl. A high blood sugar alert may be generated if the user's blood sugar is equal to or greater than one hundred forty (140) mg/dl, a low blood sugar alert may be generated if the user's blood sugar is equal to or less than eighty-two (82) mg/dl. It is noted that the dynamic biometric factors of body temperature, heart rhythm, blood pressure, and blood sugar may be referred to as wellness biometric factors, and may be overridable, as discussed further herein.

Another dynamic biometric factor may be vein pattern. Vein scans use infrared light to map the unique vein structure of a specific area, and can capture over five (5) million data points. Vein pattern data may be aggregated over the period of time to establish a vein pattern that may be part of the user's unique biometric profile. Identity may be based on a vein pattern match. Another dynamic biometric factor may be skin pore pattern. Skin sensors detect skin pores and texture. Skin pore patterns may be aggregated over the time period to establish a skin pore pattern that may be part of the user's unique biometric profile. Identity may be based on a skin pore pattern match. Another dynamic biometric factor may be voice recognition. Voice patterns, or prints, split into multiple frequencies to establish voice signatures. Voice pattern data may be aggregated over the time period to establish a voice pattern that may be part of the user's unique biometric profile. Identity may be based on a voice pattern match. It is noted that the dynamic biometric factors of vein pattern, skin pore pattern, and voice recognition may be referred to as liveliness biometric factors, and may not be overridable, as discussed further herein.

The biometric authentication module 26 may be configured to receive and aggregate the plurality of biometric values over a period of time of at least thirty (30) days, or at least sixty (60) days, to create the unique biometric profile of the user, including receiving and aggregating the plurality of first biometric values into a first biometric factor pattern and receiving and aggregating the plurality of second biometric values into a second biometric factor pattern. In one implementation, the biometric authentication module 26 may be characterized as being "local" in that it may be provided in the smart watch or a smart phone or other device carried by the user. For example, the biometric authentication module 26 may take the form of a software add-on for an existing mobile wallet application stored on the user's smart phone and that also uses, e.g., fingerprint and/or facial recognition matching. In one implementation, the biometric values may be stored locally (on, e.g., the user's smart phone) and used by the biometric authentication module 26, and only pattern data or the final biometric authentication determination may be sent to the authentication decision module 28. In another implementation, the biometric values may be sent to the authentication decision module 28.

The biometric authentication determination module 30 may be configured to receive a notification of a current financial transaction from the merchant 34 and to receive a plurality of current biometric values, including a current first dynamic biometric value and a current second biometric value. The biometric authentication determination module 30 may then compare the current biometric values to the biometric patterns and generate comparison results, including comparing the current first biometric value to the first biometric factor pattern and generating a first result, and comparing the current second biometric value to the second biometric factor pattern and generating a second result. The biometric authentication determination module 30 may then make a biometric authentication determination based on these results, as shown in the table 36 of FIG. 2.

Some of the dynamic biometric factors, such as the wellness biometric factors (e.g., body temperature, heart rhythm, blood pressure, and/or blood sugar), may be significantly outside of their normal range during certain times or events (e.g., exercising). If one or more of these variable wellness biometric factors does not support an otherwise indicated identity authentication, they may be temporarily overridden (as indicated in FIG. 2). Alternatively, one or more of the wellness biometric factors may be disabled by the user. Others of the dynamic biometric factors, such as the liveliness biometric factors (e.g., vein pattern, skin pore pattern, and/or voice recognition) may be relatively constant. If one or more of these constant factors does not support an otherwise indicated identity authentication, they may not be overridable (as indicated in FIG. 2). Significant changes in certain dynamic biometric factors may trigger health alerts. The reporting module 32 may be configured to communicate the biometric authentication determination via a communication network to the authentication decision module 28.

The authentication decision module 28 may be configured to receive the biometric authentication determination, generate an overall identity authentication score, make an identity authentication determination based thereon, and communicate the identity authentication determination to the merchant 34 for the current financial transaction. In one implementation, the biometric authentication determination may be combined with other identity-determinations, and the user's identity may be authenticated or not based on the combined determinations. For example, a biometric authentication determination score may be combined with other identity determination scores to generate a total score, the total score may be compared to a predetermined threshold total score, and, based on the result of the comparison, identity may be authenticated or not. In one implementation, the biometric score and the other identity-determining scores may each be weighted according to their established relative success in correctly determining identity.

The other identity-determining scores may be generated by, e.g., spending pattern recognition and location recognition. Spending pattern recognition may be based on identifying patterns in the user's prior purchases and determining whether a current purchase reasonably fits the purchase pattern. For example, spending pattern data may reveal that the user rarely makes large purchases or usually only makes large purchases at certain times, and so a large purchase or large purchase at an unusual time may raise an alert to consider whether the user is actually making the current financial transaction. Location recognition may be based on determining the user's current location and comparing that to the location of the current financial transaction, or may be based on identifying a pattern in the user's recent financial transaction locations and determining whether the location of the current financial transaction reasonably fits the location pattern. For example, location recognition may reveal that the user made a financial transaction in one country yesterday and is currently attempting to make a financial transaction in another country today, and so a financial transaction in very different locations may raise an alert to consider whether the user is actually making the current financial transaction. The other identity-determining data and/or scores may be previously or concurrently collected, generated, or otherwise accessible from one or more databases 38.

Based on the identity authentication determination, the authentication decision module 28 may take some appropriate action regarding the current financial transaction. For example, the authentication decision module 28 may send an alert to the user and/or the merchant 34 or may altogether stop the transaction. In one implementation, a total score (whether only a biometric score or a combined score) outside of a pre-established lower fraud threshold may result in sending an alert, while a total score outside of a pre-established higher fraud threshold may result in suspending the transaction.

Artificial intelligence may be trained and used to make some or all of the pattern recognitions, comparisons, and/or determinations made by the present invention.

Figure 3:
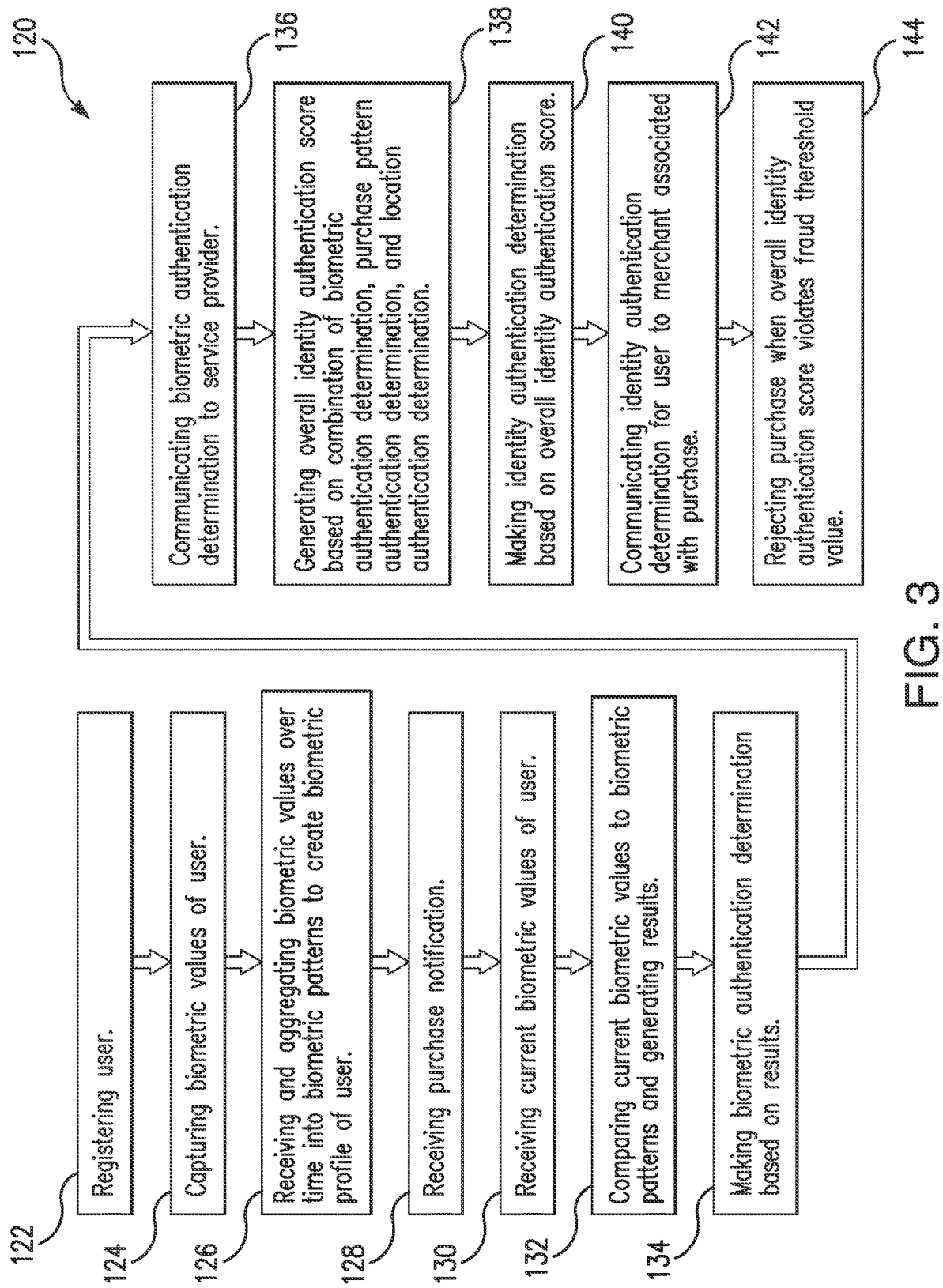
FIG. 3 is a flowchart of an embodiment of a method for authenticating a user's identity during a financial transaction using.

Referring to FIG. 3, an embodiment of a method 120 for authenticating a user's identity during a financial transaction is shown. The method 120 increases transaction security by adding biometric profiling based on dynamic biometric factors. The method 120 may include the following steps. In one implementation, the steps of the method 120 may be performed by the components of the system 20 described above, and may include any additional features described in association with the system 20.

A user may be initially registered by receiving and storing profile information of the user and activating the identity authentication service of the method 120, as shown in 122. A plurality of biometric values of the user may be measured, characterized, or otherwise captured, including a plurality of first biometric values for a first dynamic biometric factor and a plurality of second biometric values of a second dynamic biometric factor, as shown in 124. The captured biometric factors may be any two or more of body temperature, heart rhythm, blood pressure, blood sugar, vein pattern, skin pore pattern, and/or voice recognition, as described above. In one implementation, the raw biometric data may be generated locally (on, e.g., the user's smart watch or other wearable device) and used by the biometric authentication process.

The plurality of biometric values may be received and aggregated over a period of time of at least thirty (30) days, or at least sixty (60) days, to create a unique biometric profile of the user, including receiving and aggregating the plurality of first biometric values into a first biometric factor pattern and receiving and aggregating the plurality of second biometric values into a second biometric factor pattern, as shown on 126.

A notification of a current financial transaction may be received from a merchant, as shown in 128, and a plurality of current biometric values may be received, including a current first biometric value and a current second biometric value, as shown in 130. The current first biometric value may be compared to the first biometric factor pattern and a first result may be generated, and the current second biometric value may be compared to the second biometric factor pattern and a second result may be generated, as shown in 132. A biometric authentication determination may be made based on the results, as shown in 134.

Some of the dynamic biometric, such as the wellness biometric factors (e.g., body temperature, heart rhythm, blood pressure, and/or blood sugar), may be outside of their normal range during certain times or events (e.g., exercising). If one or more of these variable wellness biometric factors does not support an otherwise indicated identity authentication, they may be temporarily overridden (as indicated in FIG. 2). Alternatively, one or more of the wellness biometric factors may be disabled by the user. Others of the dynamic biometric factors, such as the liveliness biometric factors (e.g., vein pattern, skin pore pattern, and/or voice recognition), may be relatively constant. If one or more of these liveliness biometric factors does not support an otherwise indicated identity authentication, they may not be overridable (as indicated in FIG. 2). Significant changes in certain dynamic biometric factors may trigger health alerts.

In an example, a user may perform a transaction at a merchant, such as the merchant 34. The user's device, such as a smart watch or smart phone, may use near field communication (NFC) to connect with a point-of-sale (POS) device of the merchant 34. The user's mobile wallet application may be enabled for additional transaction security, such as for authenticating a user's identity during a financial transaction by adding biometric profiling based on dynamic biometric factors, as described herein. The user may have enabled all biometric factors described herein, such as the wellness and the liveliness biometric factors, for maximum transaction security. The POS device may trigger the authorization/approval payment process. The user's mobile wallet application authentication procedure, such as fingerprint and/or facial recognition, is unimpeded while triggering the additional transaction security to complete biometric pattern authentications in the background. Upon biometric pattern authentication, an approved transaction may result in a seamless mobile wallet experience for the user.

In another example, a user may perform a transaction at a merchant, such as the merchant 34. However, in this example, the user may have disabled the wellness biometric factors. The liveliness biometric factors remain enabled. The POS device may trigger the authorization/approval payment process. The user's mobile wallet application authentication procedure, such as fingerprint and/or facial recognition, is unimpeded while triggering the additional transaction security to complete biometric pattern authentications in the background, using only the liveliness biometric factors. Upon biometric pattern authentication, an approved transaction may result in a seamless mobile wallet experience for the user.

Further, in another example, a user may perform a transaction at a merchant, such as the merchant 34. In this example, the user may have enabled all biometric factors described herein, such as the wellness and the liveliness biometric factors, for maximum transaction security. The POS device may trigger the authorization/approval payment process. The user's mobile wallet application authentication procedure, such as fingerprint and/or facial recognition, is unimpeded while triggering the additional transaction security to complete biometric pattern authentications in the background. In this instance, a health alert may be triggered because the user's blood sugar is low and not within the acceptable range, as described above. The user may acknowledge the health alert to temporarily override the factor in order to proceed with the transaction. Upon biometric pattern authentication of the remaining biometric factors, an approved transaction may result in a seamless mobile wallet experience for the user.

Additionally, in another example, a fraudster may perform a transaction at a merchant, such as the merchant 34, using a user's device. The owner of the device may have enabled all biometric factors described herein, such as the wellness and the liveliness biometric factors, for maximum transaction security. The POS device may trigger the authorization/approval payment process. The user's mobile wallet application authentication procedure, such as fingerprint and/or facial recognition, is unimpeded while triggering the additional transaction security to complete biometric pattern authentications in the background. In this instance, however, an alert may triggered because the fraudster's vein pattern, for example, may not match because the fraudster may have stolen the device from the user. The transaction may be stopped and the mobile wallet application may lock, requiring the authentic owner's biometric verification.

Referring back to FIG. 3, in one implementation, the biometric authentication process may occur "locally" in that it may be performed by a smart phone or other device carried by the user. For example, the biometric authentication process may be performed by a software add-on for an existing mobile wallet application stored on the user's smart phone and that also uses, e.g., fingerprint and/or facial recognition matching. In one implementation, the biometric values may be stored locally (on, e.g., the user's smart phone) and used by the biometric authentication process, and only the pattern data or the final biometric authentication determination may be transmitted elsewhere for any additional processing. In another implementation, the biometric values may be transmitted elsewhere for additional processing.

The biometric authentication determination may be communicated via a communication network to an authentication service, as shown in 136. An overall identity authentication score may be generated based on a combination of the biometric authentication determination and other identity-determinations, as shown in 138. The other identity-determining scores may be generated by, e.g., spending pattern recognition and location recognition techniques. Spending pattern recognition may be based on identifying patterns in the user's prior purchases and determining whether a current purchase reasonably fits the purchase pattern. For example, spending pattern data may reveal that the user rarely makes large purchases or usually only makes large purchases at certain times, and so a large purchase or large purchase at an unusual time may raise an alert to consider whether the user is actually making the current purchase. Location recognition may be based on determining the user's current location and comparing that to the location of the current purchase, or may be based on identifying a pattern in the user's recent purchase locations and determining whether the location of the current purchase reasonably fits the location pattern. For example, location recognition may reveal that the user made a purchase in one country yesterday and is currently attempting to make a purchase in another country today, and so a purchase in very different location may raise an alert to consider whether the user is actually making the current purchase. In one implementation, the biometric score and the other identity-determining scores may each be weighted according to their established relative success in correctly determining identity.

An identity authentication determination may be made based on the overall identity authentication score, as shown in 140. Based on the identity authentication determination, an appropriate action may be taken regarding the current financial transaction. The identity authentication determination for the user may be communicated to the merchant for the current financial transaction, as shown in 142. In one implementation, the financial transaction may be rejected when the overall identity authentication score violates a pre-established fraud threshold value, as shown in 144. For example, in one implementation, a total score (whether only a biometric score or a combined score) outside of a pre-established lower fraud threshold may result in sending an alert, while a total score outside of a pre-established higher fraud threshold may result in suspending the transaction.

Artificial intelligence may be trained and used to make some or all of the pattern recognitions, comparisons, and/or determinations made by the present invention.

ADDITIONAL CONSIDERATIONS

All terms used herein are to be broadly interpreted unless otherwise stated. For example, the term "financial card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

As used herein, the term "user" may refer to the owner or rightful possessor of a financial card. As used herein, the term "user account" may refer specifically to a PAN or more generally to an account a user has with the financial card issuer and that the PAN is or was associated with. As used herein, the term "merchant" may refer to a business, a charity, or any other entity that can generate transactions with a user account through a transaction card network.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Computer hardware components, such as components for sensing biometric factors and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at separate times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a specific location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

The invention claimed is:

1. A system for authenticating a user's identity during a financial transaction with a merchant, the system comprising:
   a smart watch worn by the user, the smart watch including one or more sensors capturing a plurality of biometric values of the user, including a plurality of first biometric values for a first dynamic biometric factor and a plurality of second biometric values for a second dynamic biometric factor, the first dynamic biometric factor including a non-overridable liveliness biometric factor of the user selected from one or more of the following: a vein pattern, a skin pore pattern, and voice recognition, the second dynamic biometric factor including an overridable wellness biometric factor of the user selected from one or more of the following: body temperature, heart rhythm, blood pressure, and blood sugar;

a smart phone of the user executing a mobile wallet application, the mobile wallet application—
receiving and aggregating the plurality of biometric values over a period of time of at least thirty days to create a unique biometric profile of the user, including receiving and aggregating the plurality of first dynamic biometric values into a first biometric factor pattern and receiving and aggregating the plurality of second biometric values into a second dynamic biometric factor pattern,
receiving a notification of a current financial transaction,
receiving a plurality of current biometric values, including a current first biometric value and a current second biometric value,
comparing the plurality of current biometric values to the unique biometric profile and generating a plurality of comparison results, including comparing the current first biometric value to the first biometric factor pattern and generating a first comparison result, and comparing the current second biometric value to the second biometric factor pattern and generating a second comparison result,
determining a biometric authentication determination score based on the plurality of comparison results,
making a biometric authentication determination based on the comparison results, and
communicating the biometric authentication determination via a communication network to a server of a remote service provider; and the server of the remote service provider—
generating an overall identity authentication score by combining, in a weighted combination, the biometric authentication determination score, a purchase pattern authentication determination score based on a pattern of past purchases by the user, and a location authentication determination score based on a recent geographic location of the user prior to the current financial transaction,
making an identity authentication determination based on the overall identity authentication score, and
communicating the identity authentication determination for the user to the merchant for the current financial transaction.

2. The system of claim 1, wherein a plurality of body temperature biometric values are aggregated over the period of time into a body temperature biometric factor pattern forming the second dynamic biometric factor pattern in the unique biometric profile of the user.

3. The system of claim 1, wherein a plurality of heart rhythm biometric values are aggregated over the period of time into a heart rhythm biometric factor pattern forming the second dynamic biometric factor pattern in the unique biometric profile of the user.

4. The system of claim 1, wherein a plurality of blood pressure biometric values are aggregated over the period of time into a blood pressure biometric factor pattern forming the second dynamic biometric factor pattern in the unique biometric profile of the user.

5. The system of claim 1, wherein a plurality of blood sugar biometric values are aggregated over the period of time into a blood sugar biometric factor pattern forming the second dynamic biometric factor pattern in the unique biometric profile of the user.

6. The system of claim 1, wherein a plurality of vein pattern biometric values are aggregated over the period of time into a vein pattern biometric factor pattern forming the first dynamic biometric factor pattern in the unique biometric profile of the user.

7. The system of claim 1, wherein a plurality of skin pore pattern biometric values are aggregated over the period of time into a skin pore pattern biometric factor pattern forming the first dynamic biometric factor pattern in the unique biometric profile of the user.

8. The system of claim 1, wherein a plurality of voice recognition biometric values are aggregated over the period of time into a voice recognition biometric factor pattern forming the first dynamic biometric factor pattern in the unique biometric profile of the user.

9. The system of claim 1, the server of the remote service provider rejecting the current financial transaction when the overall identity authentication score violates a pre-established fraud threshold value.

10. A method for authenticating a user's identity during a financial transaction with a merchant, the method comprising:
capturing, by one or more sensors of a smart watch worn by the user, a plurality of biometric values of the user, including a plurality of first biometric values for a first dynamic biometric factor and a plurality of second biometric values for a second dynamic biometric factor, the first dynamic biometric factor including a non-overridable liveliness biometric factor of the user selected from one or more of the following: a vein pattern, a skin pore pattern, and voice recognition, the second dynamic biometric factor including an overridable wellness biometric factor of the user selected from one or more of the following: body temperature, heart rhythm, blood pressure, and blood sugar;
receiving and aggregating, by a mobile wallet application executed by a smart phone of the user, the plurality of biometric values over a period of time of at least thirty days to create a unique biometric profile of the user, including receiving and aggregating the plurality of first biometric values into a first dynamic biometric factor pattern and receiving and aggregating the plurality of second biometric values into a second dynamic biometric factor pattern;
receiving, by the mobile wallet application, a notification of a current financial transaction;
receiving, by the mobile wallet application, a plurality of current biometric values, including a current first biometric value and a current second biometric value;
comparing, by the mobile wallet application, the plurality of current biometric values to the unique biometric profile and generating a plurality of comparison results, including comparing the current first biometric value to the first biometric factor pattern and generating a first comparison result, and comparing the current second biometric value to the second biometric factor pattern and generating a second comparison result;
determining, by the mobile wallet application, a biometric authentication determination score based on the plurality of comparison results;
making, by the mobile wallet application, a biometric authentication determination based on the comparison results;
communicating, by the mobile wallet application, the biometric authentication determination via a communication network to a server of a remote service provider;

generating, by the server of the remote service provider, an overall identity authentication score by combining, in a weighted combination, the biometric authentication determination score, a purchase pattern authentication determination score based on a pattern of past purchases by the user, and a location authentication determination score based on a recent geographic location of the user prior to the current financial transaction, making, by the server of the remote service provider, an identity authentication determination based on the overall identity authentication score; and communicating, by the server of the remote service provider, the identity authentication determination for the user to the merchant for the current financial transaction.

11. The method of claim 10, wherein a plurality of body temperature biometric values are aggregated over the period of time into a body temperature biometric factor pattern forming the second dynamic biometric factor pattern in the unique biometric profile of the user.

12. The method of claim 10, wherein a plurality of heart rhythm biometric values are aggregated over the period of time into a heart rhythm biometric factor pattern forming the second dynamic biometric factor pattern in the unique biometric profile of the user.

13. The method of claim 10, wherein a plurality of blood pressure biometric values are aggregated over the period of time into a blood pressure biometric factor pattern forming the second dynamic biometric factor pattern in the unique biometric profile of the user.

14. The method of claim 10, wherein a plurality of blood sugar biometric values are aggregated over the period of time into a blood sugar biometric factor pattern forming the second dynamic biometric factor pattern in the unique biometric profile of the user.

15. The method of claim 10, wherein a plurality of vein pattern biometric values are aggregated over the period of time into a vein pattern biometric factor pattern forming the first dynamic biometric factor pattern in the unique biometric profile of the user.

16. The method of claim 10, wherein a plurality of skin pore pattern biometric values are aggregated over the period of time into a skin pore pattern biometric factor pattern forming the first dynamic biometric factor pattern in the unique biometric profile of the user.

17. The method of claim 10, wherein a plurality of voice recognition biometric values are aggregated over the period of time into a voice recognition biometric factor pattern forming the first dynamic biometric factor pattern in the unique biometric profile of the user.

18. The method of claim 10, further including rejecting, by the server of the remote service provider, the current financial transaction when the overall identity authentication score violates a pre-established fraud threshold value.

19. A method for authenticating a user's identity during a financial transaction with a merchant, the method comprising:

registering a user by receiving and storing a profile information of a user;

capturing, by one or more sensors of a smart watch worn by the user, a plurality of biometric values of the user, including a plurality of first biometric values for a first dynamic biometric factor and a plurality of second biometric values for a second dynamic biometric factor, the first dynamic biometric factor including a non-overridable liveliness biometric factor of the user selected from one or more of the following: a vein pattern, a skin pore pattern, and voice recognition, the second dynamic biometric factor including an overridable wellness biometric factor of the user selected from one or more of the following: body temperature, heart rhythm, blood pressure, and blood sugar;

receiving and aggregating, by a mobile wallet application executed by a smart phone of the user, the plurality of biometric values over a period of time of at least thirty days to create a unique biometric profile of the user, including receiving and aggregating the plurality of first biometric values into a first dynamic biometric factor pattern and receiving and aggregating the plurality of second biometric values into a second dynamic biometric factor pattern;

receiving, by the mobile wallet application, a notification of a current financial transaction;

receiving, by the mobile wallet application, a current plurality of biometric values, including a current first biometric value and a current second biometric value;

comparing, by the mobile wallet application, the plurality of current biometric values to the unique biometric profile and generating a plurality of comparison results, including comparing the current first biometric value to the first biometric factor pattern and generating a first comparison result, and comparing the current second biometric value to the second biometric factor pattern and generating a second comparison result, determining, by the mobile wallet application, a biometric authentication determination score based on the plurality of comparison results;

making, by the mobile wallet application, a biometric authentication determination based on the comparison results;

communicating, by the mobile wallet application, the biometric authentication determination via a communication network to a server of a remote service provider;

generating, by the server of the remote service provider, an overall identity authentication score by combining, in a weighted combination, the biometric authentication determination score, a purchase pattern authentication determination score based on a pattern of past purchases by the user, and a location authentication determination score based on a recent geographic location of the user prior to the current financial transaction, making, by the server of the remote service provider, an identity authentication determination based on the overall identity authentication score;

communicating, by the server of the remote service provider, the identity authentication determination for the user to the merchant for the current financial transaction; and rejecting, by the server of the remote service provider, the current financial transaction when the overall identity authentication score violates a pre-established fraud threshold value.

20. The method of claim 19, wherein a plurality of body temperature biometric values are aggregated over the period of time into a body temperature biometric factor pattern forming the second dynamic biometric factor pattern in the unique biometric profile of the user;

wherein a plurality of heart rhythm biometric values are aggregated over the period of time into a heart rhythm biometric factor pattern forming the second dynamic biometric factor pattern in the unique biometric profile of the user;

wherein a plurality of blood pressure biometric values are aggregated over the period of time into a blood pressure biometric factor pattern forming the second dynamic biometric factor pattern in the unique biometric profile of the user;

wherein a plurality of blood sugar biometric values are aggregated over the period of time into a blood sugar biometric factor pattern forming the second dynamic biometric factor pattern in the unique biometric profile of the user;

wherein a plurality of vein pattern biometric values are aggregated over the period of time into a vein pattern biometric factor pattern forming the first dynamic biometric factor pattern in the unique biometric profile of the user;

wherein a plurality of skin pore pattern biometric values are aggregated over the period of time into a skin pore pattern biometric factor pattern forming the first dynamic biometric factor pattern in the unique biometric profile of the user; and wherein a plurality of voice recognition biometric values are aggregated over the period of time into a voice recognition biometric factor pattern forming the first dynamic biometric factor pattern in the unique biometric profile of the user.

* * * * *